United States Patent [19]

Thomas

[11] 4,270,812
[45] Jun. 2, 1981

[54] DRILL BIT BEARING

[76] Inventor: Robert D. Thomas, 104 N. Plum, Tonkawa, Okla. 74653

[21] Appl. No.: 8,745

[22] Filed: Feb. 2, 1979

Related U.S. Application Data

[63] Continuation-in-part of Ser. No. 813,891, Jul. 8, 1977, abandoned.

[51] Int. Cl.³ .................. F16C 33/06; F16C 21/00; E21B 10/22
[52] U.S. Cl. .................. 308/8.2; 308/237 R; 175/371
[58] Field of Search ............... 308/8.2, 237 R, 237 A, 308/DIG. 3, DIG. 8; 175/371, 372

[56] References Cited

U.S. PATENT DOCUMENTS

| | | | |
|---|---|---|---|
| 2,086,681 | 7/1937 | Scott | 308/8.2 |
| 2,086,682 | 7/1937 | Scott | 308/8.2 |
| 2,111,751 | 3/1938 | Catland | 175/371 |
| 2,444,724 | 7/1948 | Brown | 175/370 |
| 3,476,446 | 11/1969 | Neilson | 308/8.2 |
| 3,656,764 | 4/1972 | Robinson | 308/8.2 |
| 3,984,158 | 10/1976 | Sorensen et al. | 308/8.2 |

FOREIGN PATENT DOCUMENTS

| | | | |
|---|---|---|---|
| 1334783 | 7/1963 | France | 175/371 |
| 371337 | 6/1973 | U.S.S.R. | 175/371 |

Primary Examiner—Richard R. Stearns

[57] ABSTRACT

The bearing surface of a cone cutter bit is hard-faced by forming a substantially cylindrical bearing structure on the drill bit leg having a diameter less than that of the mating bearing on said cone cutter. A cylindrical tubular sleeve of hard low friction metal which has an inner diameter greater than the diameter of said cylindrical bearing structure is inserted over said bearing structure, and a disc is placed over the end and inside said tubular metal sleeve. Solder is flowed between the sleeve and the disc to attach the sleeve and disc to the bearing structure to create a hard-faced bearing. Openings can be preformed in the sleeve or disc to match fluid cooling holes in the drill bit leg.

3 Claims, 4 Drawing Figures

DRILL BIT BEARING

RELATED APPLICATION

This application is a continuation in part of application Ser. No. 813,891 filed July 8, 1977, now abandoned.

BRIEF DESCRIPTION OF THE PRIOR ART

One of the problems with roller cone drill bits is the failure of the cylindrical bearings at the smallest diameter portion of the bit. In order to improve the wear capabilities of the bearings, the hard-faced material has been added to the bearing surface by welding, depositing, sputtering, or other similar methods. This process, however, tends to cause warpage of the drill bit because of the extreme heat involved in the process. All bearings must subsequently be ground to return the bearing surfaces to their required tolerance.

BRIEF DESCRIPTION OF THE INVENTION

This invention solves the problem exhibited by the prior art process by forming a sleeve of hard, friction-free material which is preformed to the proper outside dimensions with a prefinished interior and exterior surface, and which has all necessary holes and slots formed as required for circulation of cooling fluids. The sleeve is inserted over a precisely dimensioned surface. The end of the bearing surface is covered by a prefinished and dimensioned disc of the same material. Proper application of brazing material between the sleeve and the bearing, anchors both the sleeve and disc to the bearing surface by capillary action, both the dimension of the diameter of the bearing surface and the inside dimension of the sleeve are carefully selected so that brazing material will flow up between the two surfaces by capillary action and in which the capillary action will also self center the sleeve with respect to the axis of the bearing so that no additional grinding of the sleeve will be necessary once the surface cools. Since much less heat is involved, the sleeve maintains its tolerances creating a bearing of extremely close tolerances without subsequent machining to bring the bearing into correct specifications.

In addition to the reduced machine time, the sleeve can be made much more uniform in metal structure surface density, resulting in a much improved bearing. The above advantages have resulted in a bearing with a more predictable in-hole time and a much longer life overall.

DETAILED DESCRIPTION OF THE INVENTION

The same numbers will be used throughout the specification for the same parts in each of the Figures.

Figure 1:
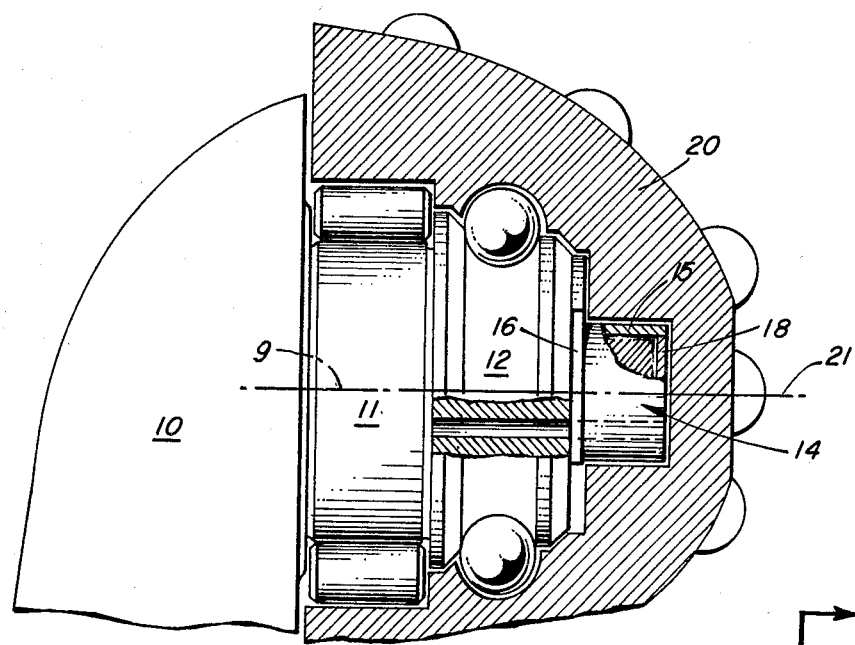
FIG. 1 is a cross-sectional view of a cone with the bearing on one leg in partial cross-section and partial full view.
Figure 3:
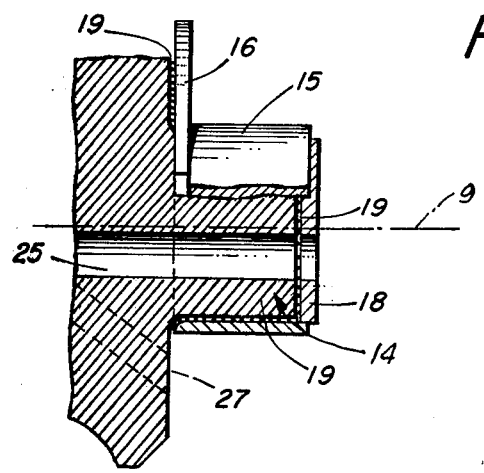
FIG. 3 is a side view of the structure of FIG. 2 taken through lines 3—3.
Figure 2:
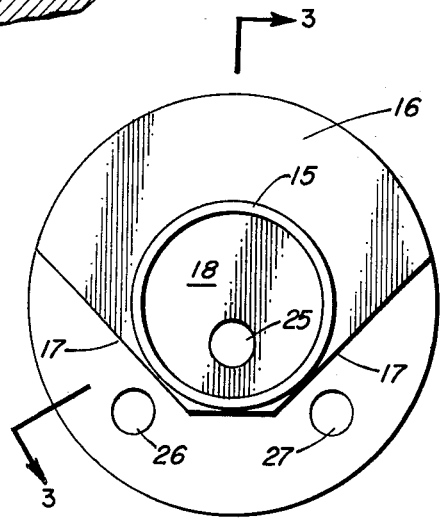
FIG. 2 is the end view of a performed sleeve-type; hard-surface bearing assembly.

Referring to all of the Figures but in particular to FIGS. 1-3, a portion of a drill leg 10 is illustrated which has a roller bearing surface 11 mounted thereto with a ball bearing surface 12 axially formed to said roller bearing surface 11. A cylindrical bearing referred to by arrow 14 is likewise axially formed to said ball bearing surface 12. Cylindrical surface 14, being extremely small, has the highest forces per square inch of any of the bearings aforementioned. Since it is small and has such high forces applied to it, these bearings tended to fail quicker than the ball or roller bearings. When any bearing fails, the bit fails and must be withdrawn from the hole being drilled and replaced, all of which costs time and money.

The cylindrical bearing of this invention is hard-faced by brazing a cylinder-type sleeve 15 to bearing 14. The outside diameter of bearing 14 and the inner diameter of sleeve 15 are selected to cause brazing compound in space 19 between bearing 14 and sleeve 15, to flow by capillary action completely filling the space between the surfaces. The capillary action also centers the sleeve 19 with the axis 9 of bearing 14 so that no additional machining of the hardened sleeve will be necessary.

A disc 16 is also brazed simultaneously with sleeve 15 at the end of bearing 14 where it joins the bearing surface on 12 of the drill bit. Disc 16 can be truncated at one or more portions 17 (see FIG. 2) for purposes to be described later. A cover disc 18 is placed over the end of bearing 14, and simultaneously brazed with the other portions 15 and 16, to provide an additional hard surface, (along with disc 16 and bearing surface 15) to take forces along the rotational axis of each of the bearings.

Discs 16 and 18 can be made separately and brazed individually. In the preferred embodiment, disc 16 and sleeve 15 are formed simultaneously, with disc 18 being added to the bearing assembly at the time the combination of disc 16 and sleeve 15 are brazed with bearing 14.

In order to provide cooling to a cone 20 which is mounted over bearings 11, 12, and 14, holes or openings are provided through the leg 10 and through bearings 11, 12, and 14, usually parallel to the rotational axis 21 of the cone cutter bit.

Disc 16 is truncated at 17 to provide fluid communication from a passage 25 in through leg 10 (not shown) and bearings 11, 12, and 14 to the bearing surfaces between cutter roller bit 20 and the above-mentioned bearings 11, 12, and 14. Additional passages 26 and 27 communicate with passage 25 and likewise provide cooling fluids to the bearing sufaces. The truncated portions 17 provide communication by disc 16.

Figure 4:
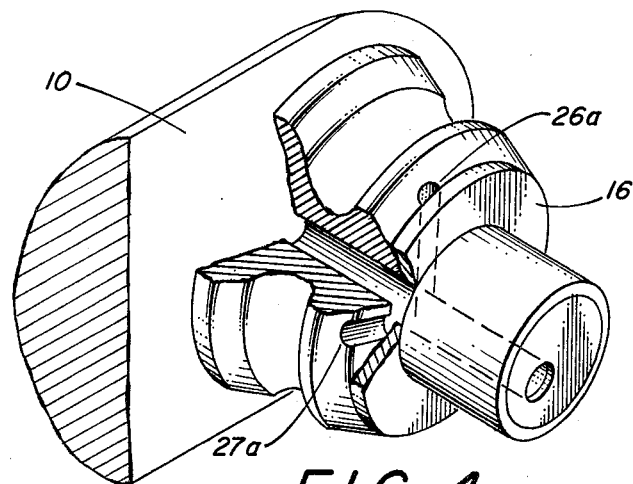
FIG. 4 is a perspective view of the bearings on a leg of a cone drill bit with a modified bearing sleeve with the bearing having a partial cross-section to illustrate the fluid cooling paths.

Referring to FIG. 4, a modified disc 16 is illustrated which contains no truncated portions since the fluid passages 26a and 27a extend radially to the bearings and under the disc 16.

During the manufacture of the preferred embodiment illustrated in FIGS. 1-3, disc 16 including the truncations 17 is brazed simultaneously with sleeve 15, and disc 18 is formed with opening 25 therethrough. The brazing compound, when heated with the bearing will flow by capillary action between the sleeve 15 and bearing surface 14 self centering the sleeve with the axis 9 of bearing 14.

The metal used for the hard-metal bearing surfaces is preferably STELLITE-3, but any metal of similar properties—extremely hard and possessing low friction properties—can be used. The preferred method for manufacturing the hard surfaces is by taking STEL- LITE-3 is powdered form and, under high pressure, forming the bearing parts.

It is obvious that changes in material or structure can be made to the formation of the bearings disclosed and still be within the spirit and scope of the invention as described in the specification and appended claims.

What I claim is:

1. In a rock bit having a leg, a bearing surface extending from said leg for journaling a roller cutter bit, said bearing surface including fluid cooling openings and a cylindrically-shaped bearing having a hard-metal face thereon and an end, an improvement in hard-facing said cylindrical bearing surface comprising a disc and a sleeve means formed of said hard-metal, said disc and said sleeve means having a prefinished interior and exterior surface; and, means including braze material for attaching said disc and sleeve means to said cylindrical bearing surface by dimensioning the external diameter of said bearing and the internal diameter of said prefinished interior of said sleeve means to allow insertion of said sleeve means over said bearing without substantial force and with a separation sufficient to cause said molten braze material to flow by capillary action, and positioning said disc over the end of said bearing, filling the space between said bearing and the interior surface of said sleeve means and under said disc, thereby causing said sleeve means to self-center on said bearing and said disc to attach to said end.

2. An improvement as described in claim 1 wherein said sleeve means includes a second disc having a central opening and a fluid pathway therethrough, said second disc soldered to said bearing surface at the end of said sleeve means opposite said cylindrically-shaped bearing end.

3. An improvement as described in claim 2 wherein said second disc has truncated portion means for exposing said fluid openings.

* * * * *